United States Patent [19]

Meller et al.

[11] Patent Number: 4,502,672
[45] Date of Patent: * Mar. 5, 1985

[54] SELF PUMPING, HYDROPNEUMATIC, TELESCOPIC, SPRING DAMPING DEVICE WITH INTERNAL LEVEL REGULATION

[75] Inventors: Theo Meller; Heinz Knecht; Ewald Kohberg; Karl-Heinz Löhr, all of Eitorf, Fed. Rep. of Germany

[73] Assignee: BOGE GmbH, Eitorf, Fed. Rep. of Germany

[*] Notice: The portion of the term of this patent subsequent to Jan. 18, 2000 has been disclaimed.

[21] Appl. No.: 420,289

[22] Filed: Sep. 20, 1982

Related U.S. Application Data

[63] Continuation of Ser. No. 231,725, Feb. 5, 1981, Pat. No. 4,368,878.

[30] Foreign Application Priority Data

Feb. 6, 1980 [DE] Fed. Rep. of Germany ....... 3004307

[51] Int. Cl.³ .............................................. F16F 9/18
[52] U.S. Cl. .................................. 267/64.17; 267/8 R
[58] Field of Search .............. 92/111; 267/8 R, 64.17, 267/64.19, 64.26, DIG. 2; 280/708

[56] References Cited

U.S. PATENT DOCUMENTS

| | | | |
|---|---|---|---|
| 2,237,915 | 4/1941 | Routson | 267/8 R |
| 3,222,048 | 12/1965 | Wilkins | 267/64.19 |
| 3,391,922 | 7/1968 | Axthammer | 267/64.17 |
| 3,497,199 | 2/1970 | Tuczek | 267/64.17 |
| 4,368,878 | 1/1983 | Meller et al. | 267/64.17 |

FOREIGN PATENT DOCUMENTS

| | | |
|---|---|---|
| 1254031 | 5/1968 | Fed. Rep. of Germany. |
| 1630107 | 9/1971 | Fed. Rep. of Germany. |
| 2519922 | 11/1976 | Fed. Rep. of Germany. |
| 632937 | 2/1962 | Italy ................................ 280/708 |
| 378697 | 7/1964 | Switzerland ...................... 267/64.17 |

Primary Examiner—Douglas C. Butler
Assistant Examiner—R. R. Diefendorf
Attorney, Agent, or Firm—William R. Hinds

[57] ABSTRACT

A self-pumping, hydropneumatic, telescopic, spring damping device with internal level regulation, especially for automotive vehicles, includes an oil filled working chamber and a working piston with damping devices, the working piston rod being hollow and forming a pump chamber for a pump rod which automatically pumps oil from an oil reservoir into the working chamber. A control opening permits flow from the work chamber to the oil reservoir when the desired level is exceeded. A gas cushion in a gas spring chamber connected with the working chamber pressurizes the oil in the working chamber. The gas spring chamber includes a separating piston, and may be connected axially to the working chamber in the region of a flexible or elastic partition which supports the pump rod. The partition includes communicating passages. A pump suction tube communicates a pump rod cavity with the oil reservoir, and is yieldable with respect to movements of the flexible partition. For disposition of the separating piston of the gas spring chamber in the region of the partition, the separating piston of the gas spring chamber may be recessed such that the pump suction tube can be accommodated by the recess. The device may be made as a modular system in which major components are made as a standard module, and other functional components, such as the oil reservoir chamber and the gas spring chamber are made as variable modules according to particular needs. The modules can be separately disposed and interconnected by tubular conduits.

11 Claims, 11 Drawing Figures

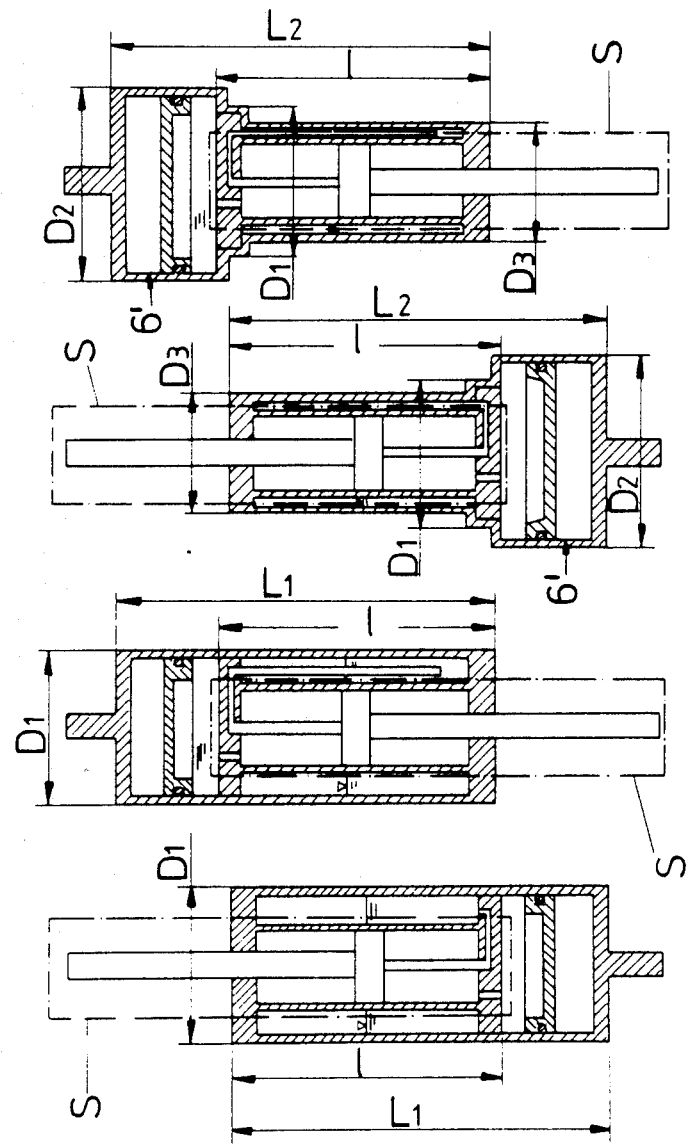

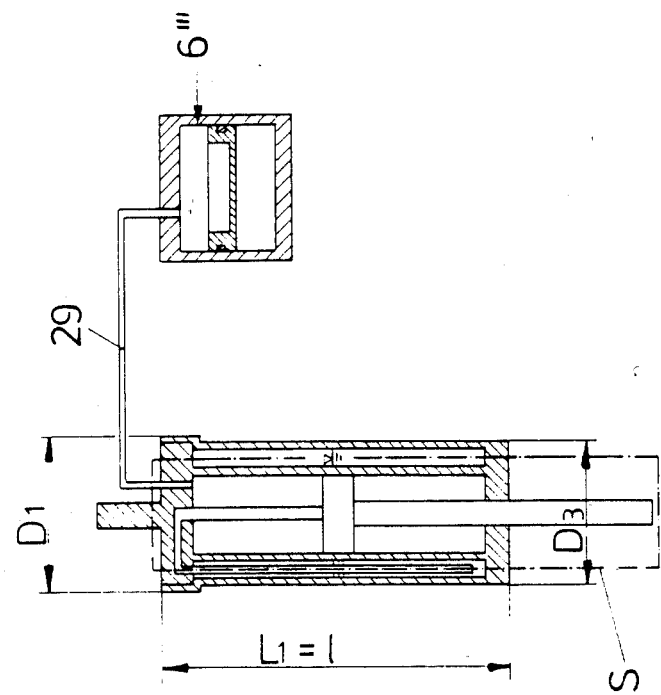
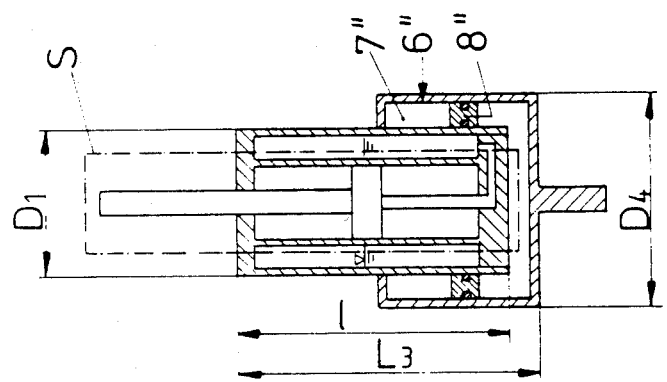

SELF PUMPING, HYDROPNEUMATIC, TELESCOPIC, SPRING DAMPING DEVICE WITH INTERNAL LEVEL REGULATION

This is a continuation of application Ser. No. 231,725 filed Feb. 5, 1981, now U.S. Pat. No. 4,368,878, issued Jan. 18, 1983.

FIELD OF THE INVENTION

This invention relates to a self pumping, hydropneumatic, telescopic, spring damping device or element with internal level regulation, for use in vehicles, especially automobiles.

BACKGROUND AND SUMMARY

A device of the type to which the invention relates may comprise a working cylinder with an oil filled working chamber having a working piston borne slidably therein, the piston including damping means such as valves, and carried at the end of a hollow piston rod that passes sealingly out of the working cylinder. A gas cushion disposed in a gas spring chamber connected with the working chamber puts the oil in the working chamber under pressure. An oil reservoir chamber defined by an outer jacket tube, preferably surrounding the working chamber, contains oil and gas, with a free surface therebetween. A hollow pump rod is elastically borne on a partition, which pump rod is communicated at one end with the oil reservoir chamber below its oil surface, and at its other end, which has a pump suction valve, it cooperates with a pump chamber disposed in the hollow piston rod for regulation of the level in that, as a function of the back and forth spring motions, it delivers oil from the oil reservoir chamber into the working chamber, while upon exceeding of the ideal level, oil can flow from the working chamber into the oil reservoir through a control opening provided in the pump rod. A pump outlet valve disposed at the end of the pump chamber remote from the partition, and located in a control sleeve that is located in the piston rod cavity between the piston rod and the pump rod, forms, with the piston rod, passages from the pump outlet valve to the working chamber. The end of the control sleeve toward the partition preferably constitutes a control edge for the control opening. In the gas spring chamber in the region of the surface between oil and gas, there is movably disposed a separating body of solid material.

From German Patent No. 1,630,107, a shock absorbing device similar to the above described telescopic spring damping element with internal level regulation is known. In this known device, however, the separating body between oil and gas located in the gas spring chamber is made as a separating membrane. In such a structure, diffusion of the media that are to be separated from each other may have an unfavorable effect on the functioning of the level regulating spring damper element. Additionally, in this known spring damping element, the pump rod elastic suspension, provided to avoid a disadvantageous rectangular pump diagram, is so constituted that the pump rod end that is to be suspended is made as a rubber/metallic part borne in a special chamber provided in the partition. This is not only technically cumbersome, but it also involves a rather axially long construction of the spring damping element. Still further, mounting of the known level regulating, spring damping element with an upwardly disposed piston rod is generally not possible. Also, the pump outlet valve is disposed in the region of the working piston, and thus because of the gas in the oil reservoir chamber there would remain a gas cushion in the pump chamber that would practically hinder a further pumping of oil.

In a spring damping element of the type disclosed in German Patent No. 2,519,922, it is true that incorporation in a vehicle with an upwardly disposed piston rod is possible. However, in this known spring damping element the separating body of solid material for separation of oil and gas in the gas spring chamber is constituted by a stepped sleeve arrangement that is specially wound, surrounding the work cylinder, with respective annular passages, the upper one for gas being especially narrow, and the lower for the passage of oil, whereby the two passages are connected with the working chamber at their ends that are opposed to each other. Here there is not only a great outlay for construction, but because of this separating sleeve arrangement and the passages, this known spring damping device again does not function if incorporated in a vehicle with the piston rod at the bottom. Moreover, in this known spring damping element the fixing of the control sleeve in the piston rod cavity in the region of the working piston is effected by a special technically expensive bearing arrangement. In addition, in this known spring damping element, the elastic bearing of the pump rod that is not shown in detail is made according to the known pump rod bearing of German Patent No. 1,630,107.

As will be clear, in the spring damper element according to German Patent No. 2,519,922, especially because of the sleeve arrangement for separation of gas and oil, the bearing of the control sleeve disposed in the piston rod cavity and the elastic suspension of the pump rod, even apart from the considerable technical outlay, there is also an axially longer construction, i.e., a greater fixation length of the spring damping element. This as well as other drawbacks in the known spring damping element with internal level regulation make it not well suited for large scale manufacture. Moreover, there is only a limited applicability of the known spring damping element with internal level regulation because of the many configurations of present day axle arrangements in cars, combination vehicles and truck construction, in view of the actually present space for incorporation for an element or device of the kind in question, to bring about the different transmission ratios of the linkages, as well as the necessity of producing a multiplicity of intrinsic vibration values.

A basic problem to which the instant invention is directed is the production of a simple and efficient self pumping, hydropneumatic, telescopic, spring damping element with internal level regulation that avoids the drawbacks of the known damping elements and is simpler in construction, which has a shorter axial fixation length, and which can be mounted in various positions and orientations, so that its manufacture in large series will be economically feasible. Therefore, the spring damping element that is to be produced in accordance with the invention will be applicable in many ways to modern requirements in automobile construction.

This problem is generally solved in accordance with the invention in that, in the case of a telescopic, spring damping element with internal level regulation of the type in question, in that the gas spring chamber contains, in a known way, a separating piston guided with seal at its periphery, that in the region of the partition that supports or braces the pump rod the gas spring chamber is connected axially to the working chamber and is communicated with it via at least one passage opening in the partition, wherein the partition itself in the region of the working chamber is elastic and presents a pump suction tube for connection of the pump rod cavity with the oil reservoir below the surface of the oil, which tube is made to be yieldable with respect to the movements of the partition, and the separating piston on its face toward the partition presents a recess in which the pump suction tube can be received upon location of the separating piston in the region of the partition.

A spring damping element with internal level regulation according to the invention is technically more simple in construction and basically is shorter in the hydraulic part also, relative to known damping devices of the type in question. Because of its overall construction, it is ensured that whether incorporated with the piston rod below or above, there is no residual gas cushion occurring in the pump chamber, whereby incorporation that is independent of orientation or position is made possible for this telescopic spring damping element in accordance with the invention. Thereby the spring damping element of the invention can be utilized in many ways. Because of the technical simplicity and compactness, as well as the capability of assembly that is independent of position or orientation, the economical production of the level regulating, spring damping element on a large industrial scale is readily attainable.

From German Patent No. 1,254,031, especially FIG. 2, it is known in principle, of course, that a gas spring chamber that has a separating piston sealingly guided at its periphery can be connected axially to a working chamber in the region of a partition that supports or braces the pump rod, whereby the gas spring chamber is communicated with the working chamber via a passage opening in the partition. However, this known arrangement has a substantially different construction otherwise relative to the level regulating, telescopic, spring damping element in accordance with the invention. Thus, in the known arrangement, the partition is made rigid, and also the work piston that is slidably guided in the work chamber has no damping valves or devices. This disclosure in the literature therefore would not contribute to the present invention.

According to an especially preferred form of embodiment of the invention, the partition in the region of the work chamber is made as a leaf spring wall, and the pump suction tube is made as a tube spiral perpendicular to the axis of the damper, between its fastenings to the partition on the one hand and to the oil reservoir on the other. Hereby, there is an especially simple compact construction.

There is obtained a simplified construction also if the two fastenings of the pump suction tube are made as sealed plug connections.

It is also advantageous to make the fastening of the control sleeve in the piston rod cavity as a sealed plug connection, whereby the end of the control sleeve turned away from the partition presents a peripheral seal against the piston rod cavity, outside the pump outlet valve, and is applied frontally against the adjacent front wall of the piston rod cavity, which there presents a venting opening at the end.

In the interest of simplified manufacture, the fastening of the region of the partition in the jacket tube that closes off the oil reservoir is advantageously made as a sealed plug connection. Correspondingly, the fastening of at least one of the two closures at the ends (cover and floor) of the damping device is advantageously made in the jacket tube as a sealed plug connection.

The advantages of the invention are especially evident if, according to a further feature of the telescopic spring damping element, it is made as a modular system wherein the work cylinder that contains the working chamber and appurtenant modules, especially the working piston with vacuum and pressure damping valve means, piston rod with pump chamber, control sleeve with pump discharge valve, pump rod with pump suction valve, piston rod guide and sealing complex, is made as a uniform standard module, and the rest of the function modules, especially the oil reservoir, gas spring chamber with separating piston, etc., are made as modules that are varied according to the application in question as to size and/or spacial arrangement. Thereby the gas spring chamber with the separating piston can at least partly surround the oil reservoir or the working cylinder. Also, the gas spring chamber with the separating piston and/or the oil reservoir chamber can be modules disposed separately with reference to the standard module group, and joined with the work chamber by respective tube conduits.

The features of such a modular system according to the invention, offering simplicity, compactness and assembly that is independent of position, make possible a practically unrestricted application of the spring damping element in automobile construction. Particularly, with this further feature of the invention, there is an extremely good capability of adaptation of the spring damping element to the available space for incorporation in the vehicle in question. Moreover, such a shock absorber element according to the invention is variable in spring characteristic design, with consideration of fixed transmission ratios (wheel path to strut path) of the axle/strut linkages. No additional detailed explanation is necessary to establish that with such a modular system there is also a simple and economical manufacture on an industrial scale of the level regulating shock absorber.

For the sake of good order, let it be said that the length of the pump suction tube dipping into the oil reservoir is to be selected to correspond to the particular application in question. This means that this immersing length is maximal with assembly of the spring shock absorber element with piston rod disposed below, and minimal when the piston rod is disposed upward.

Other aspects, features and advantages of the invention will be apparent from the ensuing description of preferred exemplary embodiments, taken with reference to the accompanying drawings and their schematic illustrations of exemplary preferred embodiments.

BRIEF DESCRIPTION OF THE DRAWINGS

FIGS. 4 to 9 schematically illustrate various forms of embodiments of the level regulating, spring shock absorber element of the invention, built up according to modular systems.

DESCRIPTION OF PREFERRED EMBODIMENTS

Figure 1:
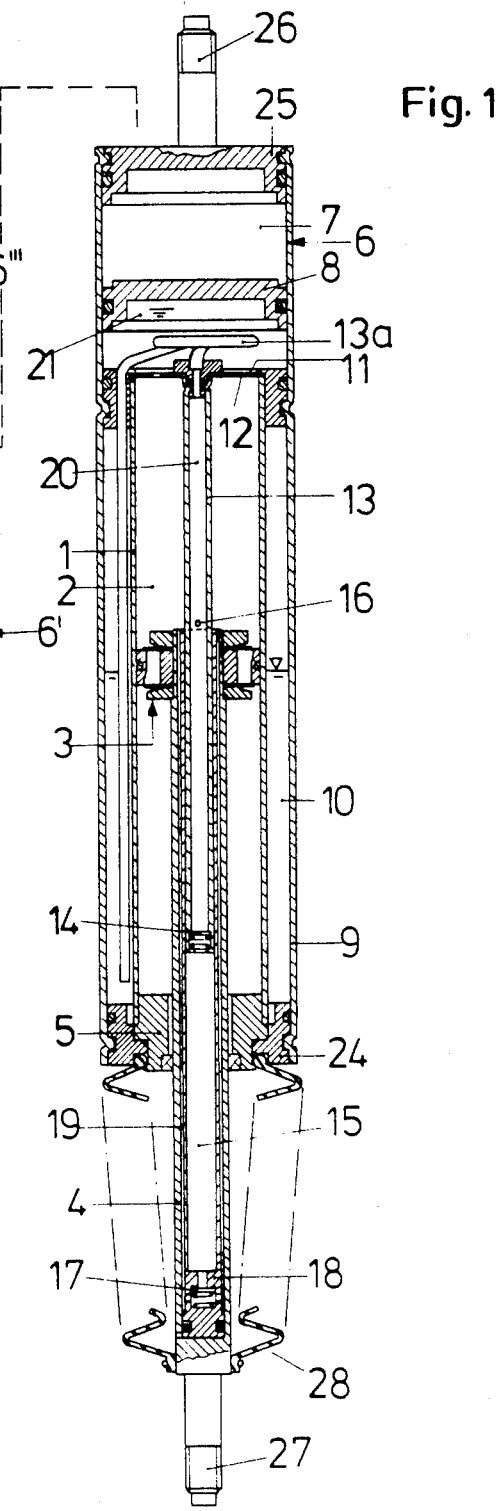
FIG. 1 is an axial longitudinal section through a level regulating, telescopic, spring shock absorber element in accordance with the invention, particularly for incorporation with the piston rod disposed below.

The level regulating, telescopic, spring shock absorber element according to FIG. 1 includes a working cylinder 1 with an oil filled working chamber 2 in which a working piston 3 is slidably borne. Working piston 3 has vacuum and pressure damping valves, respectively, that may be considered as conventional and hence are not characterized in detail. The working piston is located at the end of a hollow piston rod 4 that passes with seal from the working chamber 1. A piston rod guide and sealing complex is designated by the numeral 5.

A gas spring chamber 6 is connected with working chamber 2, the chamber 6 having therein a gas cushion 7 that pressurizes the oil in working chamber 2. The gas spring chamber 6 has a separating piston 8 for separation of the oil from gas cushion 7, the piston being sealingly guided at its periphery. Working chamber 2 is also surrounded by an oil reservoir chamber 10 that is defined by an outer jacket tube 9. In the oil reservoir chamber 10, there is a free surface between oil and gas.

Figure 2:
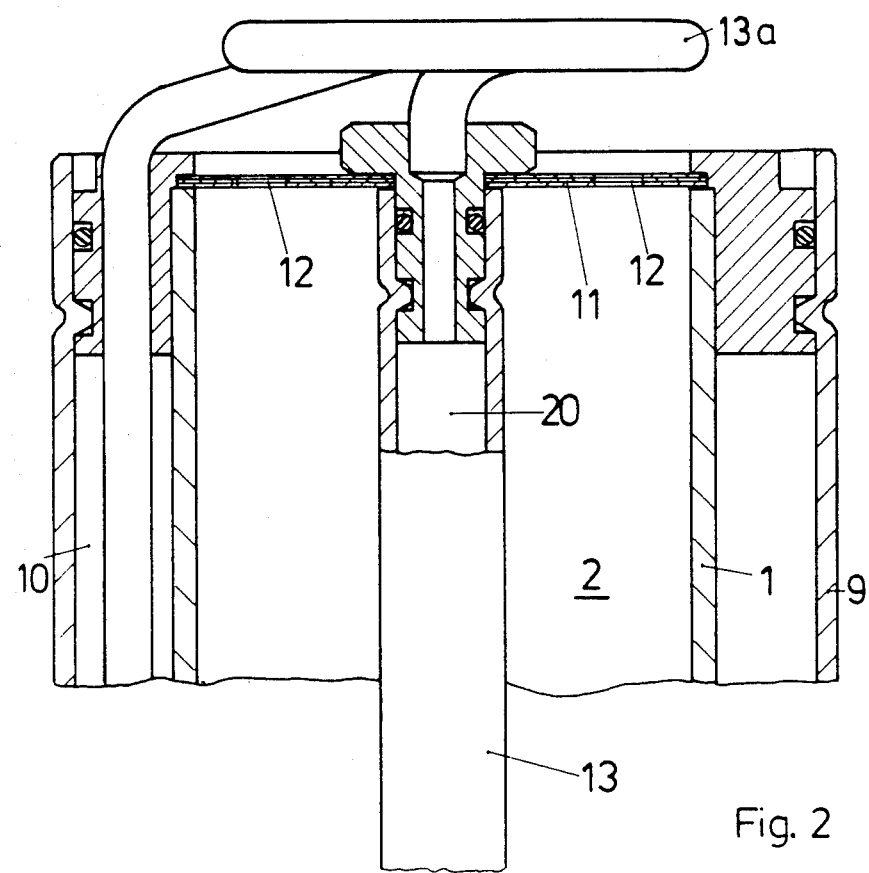
FIG. 2 in enlarged detail shows the elastic pump rod suspension and pump suction tube of the spring shock absorber element of FIG. 1.

The telescopic spring shock absorber element according to the invention, that advantageously is used as a telescoping strut, also has a partition 11 between working chamber 2 and gas spring chamber 6 (see also FIG. 2). Partition 11 is made as a leaf spring wall 11 in the region of working chamber 2, and presents passage openings 12 for communication of working chamber 2 with gas spring chamber 6.

A hollow pump rod 13 is elastically borne on partition 11, the rod being connected at one end via a pump suction tube 13a with oil reservoir chamber 10 below its oil surface, and at its other end, which has a pump suction valve 14, it cooperates with a pump chamber 15 disposed in hollow piston rod 4 for level regulation. For this, pump rod 13, as a function of the in and out or back and forth spring motions delivers oil from reservoir 10 into working chamber 2, while, when the ideal level of the oil is exceeded, oil can flow off from working chamber 2 through a control opening 16 located in pump rod 13.

Figure 3:
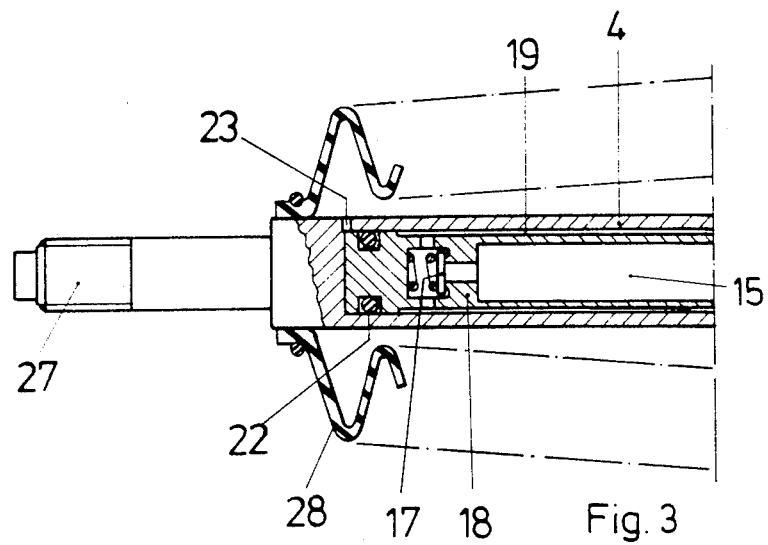
FIG. 3 shows in enlarged detail the opposite end of the pump rod and control sleeve with pump discharge valve.

On the end of the pump chamber 15 that is remote from partition 11 there is a pump discharge valve 17 (see also FIG. 3) disposed in a control sleeve 18 located in the piston rod cavity 15 between piston rod 4 and pump rod 13, forming passages 19 that lead to working chamber 2. The end of control sleeve 18 that faces toward partition 11 constitutes a control edge for control opening 16.

Pump suction tube 13a, for connection of pump rod cavity 20 with oil reservoir 10 below the surface of the oil, is made yielding with reference to the movements of partition 11, in that it is constituted as tubular spirals running perpendicular to the axis of the spring shock absorber element, between its fastenings to partition 11 on the one hand and the oil reservoir 10 on the other.

Separating piston 8 has a recess 21 on its face that is turned toward partition 11, in which recess the pump suction tube 13a can be received in the disposition of the separating piston 8 in the region of partition 11.

As FIG. 2 shows with particular clarity, the two fastenings of pump suction tube 13a on partition 11 in the pump rod 13 on the one hand and in the region of oil reservoir 10 on the other are made as sealed plug connections.

The fastening of control sleeve 18 in the piston rod cavity 15 is made as a sealed plug connection, whereby the end of control sleeve 18 that faces away from partition 11 outside pump discharge valve 17 presents a peripheral seal 22 with reference to the piston rod cavity 15 and is applied frontally against the adjacent front wall of piston rod cavity 15, which has a vent 23 at the end.

The fastening of the region of partition 11 that closes off the oil reservoir 10 in jacket tube 9 is made as a sealed plug connection, as illustrated.

The fastenings of both end closure parts 24 and 25 of the shock absorber in jacket tube 9 are made as sealed plug connections.

For the sake of completeness, it should be mentioned that numerals 26 and 27 designate the two fastening bolts for connection of the shock absorber to parts of the vehicle that are to be joined by it. Moreover, reference character 28 denotes a protective cuff for the issuing end of piston rod 4.

Advantageously the telescopic spring damping element with internal level regulation is made as a modular system. Thus, there are many possibilities of application with simple means, as indicated, for example, by FIGS. 4 to 9. To this end, the work cylinder 1 that contains working chamber 2, and appertinent functional groups, especially working piston 3 with vacuum and pressure damping valve means, piston rod 4 with pump chamber 15, control sleeve 18 with pump discharge valve 17, pump rod 13 with pump suction valve 14, and piston rod guide and seal complex 5, are made as standard modular groups S (as indicated in dot-and-dash lines in FIGS. 4 to 9), while the other functional groups, especially oil reservoir 10 and gas spring chamber 6 with separating piston 8, are made as groups that vary in size and/or spacial disposition according to the specific application. Consequently, all embodiments according to FIGS. 4 to 9 have the same fixation length l and the same external diameter $D_1$ of standard group S.

In particular, the embodiments according to FIGS. 4 and 5 have the same total fixation length $L_1$ over which the external diameter $D_1$ also remains constant. The two embodiments are distinguished from each other, however, in that according to FIG. 4 the device is built in with the piston rod disposed upwardly, and according to FIG. 5 with the piston rod downwardly in the vehicle. Correspondingly, pump suction tube 13a has its minimal length with respect to its dipping into the oil reservoir 10 in the arrangement according to FIG. 4, and in the embodiment according to FIG. 5 it has its maximal length.

In the embodiments according to FIGS. 6 and 7, there is again the same total fixation length $L_2$ whereby the difference in length with respect to the standard fixation length l can be less than in the embodiments according to FIGS. 4 and 5. In the embodiments according to FIGS. 6 and 7, moreover, the external diameter $D_2$ of gas spring chamber 6' is greater than the standard external diameter $D_1$. Moreover, external diameter $D_3$ of oil reservoir 10 is smaller than standard diameter $D_1$. The resulting jacket tube 9' and the group of FIGS. 6 and 7 built in the region of gas spring chamber 6' are shown in enlarged detail in FIG. 6a.

The embodiments according to FIGS. 6 and 7 thus have a different spring characteristic as opposed to those of FIGS. 4 and 5, with the same standard module S so that, for example, fixed transmission ratios (wheel path to strut path) of the axle/strut linkages can be taken into account. Additionally, as FIG. 6 shows, there can be incorporation with piston rod upward, and in the arrangement according to FIG. 7, incorporation is provided with piston rod disposed downwardly in the vehicle.

The exemplary embodiment shown in FIG. 8 differs from the previously described embodiments in that the gas spring chamber 6" with separating piston 8" partly encloses the oil reservoir 10. Hereby there is a substantially diminished total fixation length $L_3$ which is only slightly larger than standard length 1. On the other hand, however, there is a correspondingly enlarged external diameter $D_4$ of gas spring chamber 6", as opposed to standard diameter $D_1$. According to a further modification, gas spring chamber 6" may also directly enclose the working cylinder 1, e.g. in the case in which the oil reservoir 10 is made as a separate module (similarly to gas spring chamber 6''' of FIG. 9) as opposed to standard module S.

Figure 9A:
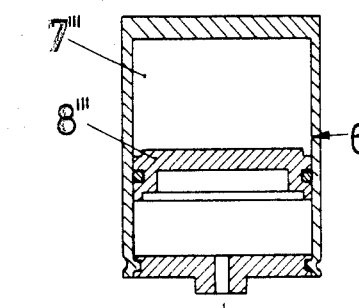
FIGS. 6a and 9a show detailed parts in enlarged detail, of the forms of embodiment according to FIGS. 6 and 7 and FIG. 9, respectively.
Figure 6A:
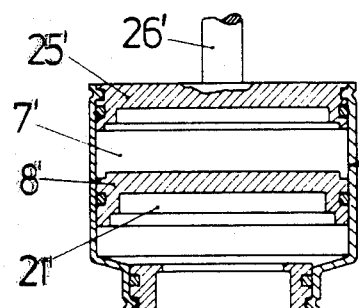

In the embodiments according to FIGS. 9 and 9a, as already indicated above, gas spring chamber 6''' is made as a separate module as opposed to standard module S, and can be connected with working chamber 1 via a tubular conduit 29. In this embodiment there is a minimal overall length of $L_1$ that corresponds to standard length 1.

The exemplary embodiments of FIGS. 8 and 9 above all offer in a simple way the possibility of optimal adaptation of the level regulating telescopic spring damping element according to the invention to the actual spaces for incorporation in vehicles. On the other hand, as is obvious, these embodiments also are variable in the design of the spring characteristic. For the sake of completeness, it should also be mentioned that the embodiments according to FIGS. 8 and 9 can be built in in reverse from what is illustrated, hence with piston rod up or down.

The module system illustrated in FIGS. 4 to 9 retains moreover the special advantage that the relatively expensive standard module S remains uniform in manufacture, such standardizing serving to save manufacturing costs in a substantial way.

In general, the standard module can be standarized, whereas the rest of the modules, i.e., the gas spring chamber and separating piston and oil reservoir with appertinent cover and floor, need to be adapted to the requirements of the particular case (installation room, spring characteristic, etc.).

Having thus described exemplary preferred embodiments of our invention as required by the Patent Statutes, we claim:

1. A self-pumping, hydropneumatic, telescopic, spring damping device with internal level regulation, especially for automotive vehicles, comprising: a working cylinder with an oil filled working chamber and a working piston slidably borne therein and provided with damping devices, said working piston being carried by a hollow piston rod that passes sealingly from the working cylinder, a gas cushion in a gas spring chamber for pressurizing the oil in the working chamber, an oil reservoir chamber having a free surface between oil and gas in the reservoir, a hollow pump rod having a cavity and borne on a partition, which pump rod is communicated at one end with the oil reservoir chamber below the surface of the oil, said pump rod having a pump suction valve and cooperating with a pump chamber disposed in the hollow piston rod for level regulation, such that as a function of the in and out spring motions oil is delivered from the oil reservoir chamber into the working chamber, a control opening in the pump rod such that, when predetermined conditions are exceeded, oil can flow from the working chamber into the oil reservoir via the control opening, a pump discharge valve disposed in the pump chamber relatively remote from the partition, said pump discharge valve being located in a control sleeve located in the piston rod cavity between the piston rod and the pump rod, said control sleeve forming passages which lead from the pump, discharge valve to the working chamber, the end of said control sleeve toward said partition forming a control edge for said control opening, and a separating body of solid material movably disposed in the gas spring chamber in the region of the interface between oil and gas, said separating body of solid material comprises a separating piston guided by a seal at its periphery in said gas spring chamber, said gas spring chamber being in pressurizing communication with said work chamber via at least one passage in said partition, the partition itself in the region of the working chamber being elastic, a pump tube fluidly communicating the pump rod cavity with the oil reservoir chamber below the surface of the oil, said pump suction tube being constructed and arranged so as to be yieldable with respect to movement of said partition.

2. A device as claimed in claim 1 wherein the fastening of the control sleeve in the piston rod cavity is made as a sealed plug connection, whereby the end of the control sleeve which faces away from said partition presents a peripheral seal with reference to the piston rod cavity and is frontally applied against the adjacent face of the piston rod cavity.

3. A device as claimed in claim 1 wherein said gas spring chamber is connected to the working cylinder in the region of said partition, the permitted travel of said separating piston at least partially overlapping said pump suction tube in the area of said partition, said separating piston being configured and arranged to clear said pump suction tube at its area of overlapping travel.

4. A self-pumping, hydropneumatic, telescopic, spring damping device with internal level regulation, especially for automotive vehicles, comprising a working cylinder with an oil filled working chamber, a working piston slidably borne therein and provided with damping devices, said piston being carried by a hollow piston rod that passes sealingly from the working cylinder, an oil reservoir chamber, pump means including a hollow pump rod supported at one end and extending into a pump chamber in said hollow piston rod for delivering oil from the oil reservoir to the working chamber in response to in and out spring motions during use, means for permitting oil flow from said working chamber when said piston rod moves out of said working cylinder by a predetermined amount, a gas cushion in a gas spring chamber for pressurizing the oil in said working chamber, said pump rod being yieldably supported at one end by a spring-like elastic partition extending across said working cylinder in said working chamber and being perforate so that its two sides are in fluid communication, a pump suction tube connected to said pump rod and the oil reservoir for fluidly communicating the oil reservoir with the hollow pump rod and thence with said pump chamber, said pump suction tube being constructed and arranged so as to be yieldable with respect to movement of said elastic partition and said hollow pump rod relative to said working cylinder and said oil reservoir.

5. A device as claimed in claim 4 wherein said gas spring chamber is connected to the working cylinder in the region of said partition, and includes a separating piston, the permitted travel of said separating piston at least partially overlapping said pump suction tube in the area of said partition, said separating piston being configured and arranged to clear said pump suction tube at its area of overlapping travel.

6. A device as claimed in claim 5 or claim 3 wherein said separating piston is at least partially axially recessed in its central portion so as to clear said pump suction tube.

7. A device as claimed in claim 6 wherein said separating piston is an annulus and lies outwardly of said pump suction tube.

8. A spring damping device according to claim 7 wherein the gas spring chamber with the separating piston at least partly encompasses at least one of the oil reservoir chamber and the working cylinder.

9. A telescopic spring damping device according to claim 1 or claim 4 wherein said partition, in the region of the working chamber, is made as a leaf spring wall, and said pump suction tube adjacent its connection to the partition and hollow pump rod is made as a tubular spiral running perpendicularly to the axis of the damping device.

10. A device as claimed in claim 1 or claim 4 wherein the device is made as a modular system, wherein the working cylinder and appurtenant functional components, including at least the working piston, the piston rod with the pump chamber, the pump rod, and a piston rod guide and seal complex, are made as a standard module, and the remainder of the functional components, including the oil reservoir chamber and the gas spring chamber are made as modules that are variable according to the specific application with respect to at least one of size and spatial arrangement, such that said standard module is combinable with variable modules for particular applications.

11. A spring damping device according to claim 10 wherein at least one of the gas spring chamber and the oil reservoir chamber comprises a separately disposed module with respect to said standard module, connectable with said standard module by a tubular conduit.

* * * * *